(12) United States Patent  
Mecham et al.

(10) Patent No.: US 7,337,843 B2
(45) Date of Patent: Mar. 4, 2008

(54) SOLAR BLACKBODY WAVEGUIDE FOR SOLAR ASSISTED OIL RECOVERY APPLICATIONS

(76) Inventors: Travis W. Mecham, 10800 S. 241 W Ave., Sapulpa, OK (US) 74066; Leslie Clark Ashton, 3230 E. Granite Cir., Sandy, UT (US) 84092

( * ) Notice: Subject to any disclaimer, the term of this patent is extended or adjusted under 35 U.S.C. 154(b) by 207 days.

(21) Appl. No.: 11/352,967

(22) Filed: Feb. 13, 2006

(65) Prior Publication Data

US 2007/0187104 A1    Aug. 16, 2007

(51) Int. Cl.
    *E21B 36/00*    (2006.01)
(52) U.S. Cl. .................. 166/302; 166/369; 166/243; 126/620; 126/685; 126/714
(58) Field of Classification Search .............. 166/369, 166/75.11, 243, 272.1, 302; 126/684, 685, 126/701, 617, 620, 400, 648, 714
    See application file for complete search history.

(56) References Cited

U.S. PATENT DOCUMENTS

| | | | |
|---|---|---|---|
| 4,026,267 A | 5/1977 | Coleman | |
| 4,261,335 A | 4/1981 | Balhorn | |
| 4,397,152 A * | 8/1983 | Smith | 60/641.15 |
| 4,461,277 A | 7/1984 | Pardo | |
| 4,483,320 A | 11/1984 | Wetzel, Jr. et al. | |
| 4,682,582 A | 7/1987 | Zsida | |
| 4,841,946 A | 6/1989 | Marks | |
| 4,982,723 A | 1/1991 | Mori | |
| 5,058,675 A * | 10/1991 | Travis | 166/272.3 |
| 5,275,149 A | 1/1994 | Ludlow | |
| 5,511,145 A | 4/1996 | Bailey et al. | |
| 6,899,097 B1 | 5/2005 | Mecham | |

* cited by examiner

*Primary Examiner*—Jennifer H. Gay
*Assistant Examiner*—Robert Fuller
(74) *Attorney, Agent, or Firm*—Molly D. McKay

(57) ABSTRACT

A method to enhance oil shale, oil sand, asphaltic crude oil, or other high viscosity crude oil production by using a solar blackbody waveguide to heat these formations in situ. A parabolic mirror collects and directs the solar flux into a vertical shaft of a well drilled into the formation. This vertical shaft is lined with a reflective sleeve that reflects nearly all of the sunlight down into the well bore. The reflective sleeve ends at the top of the formation so that below this point, the solar flux is permitted to make successive reflections with the interior of the metal well casing or solar blackbody waveguide coil. The coil absorbs the solar flux, converting it to heat. Heat from the coil is transferred by conduction into the formation and allowing the formation to be produced by traditional methods.

6 Claims, 3 Drawing Sheets

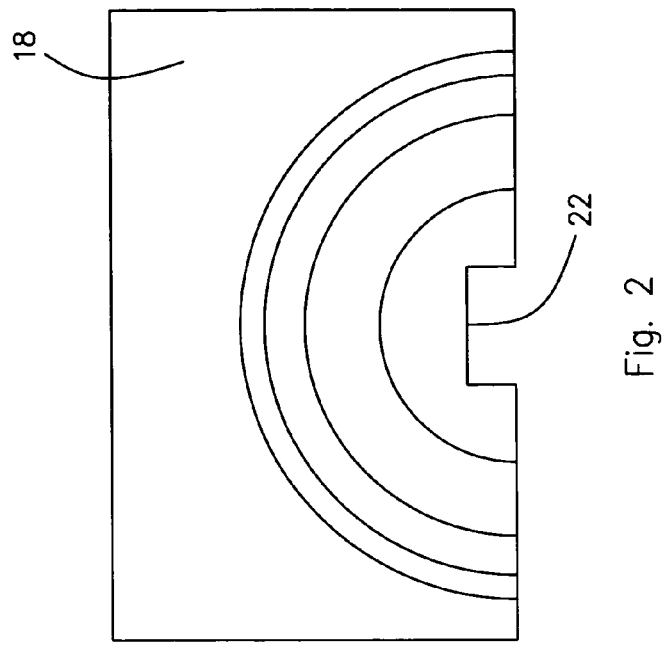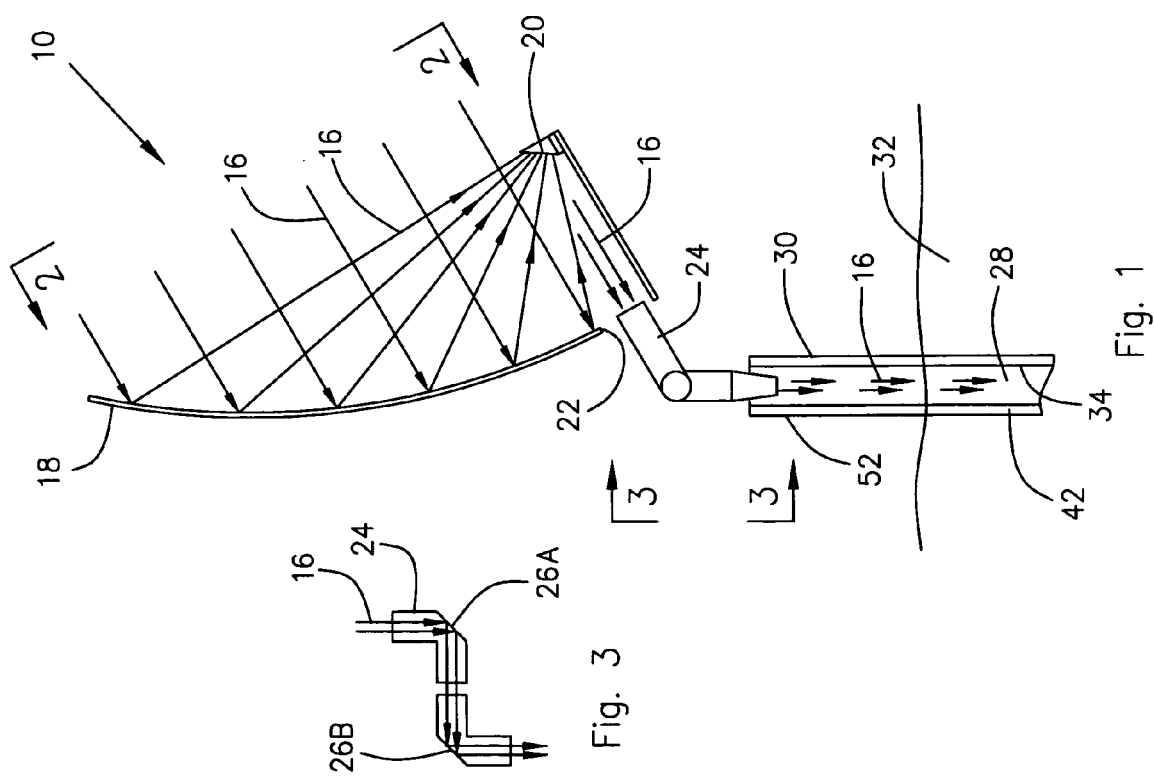

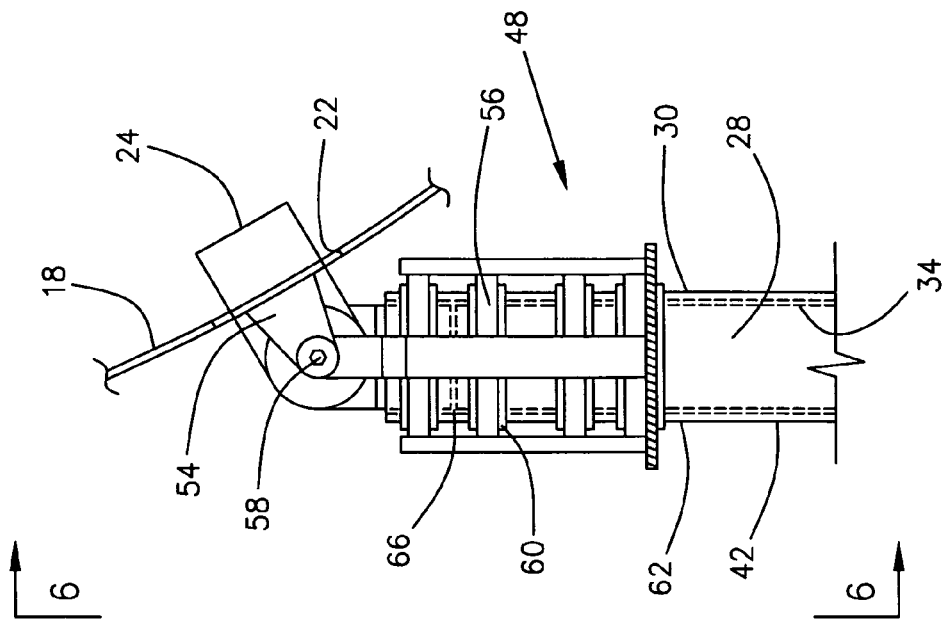
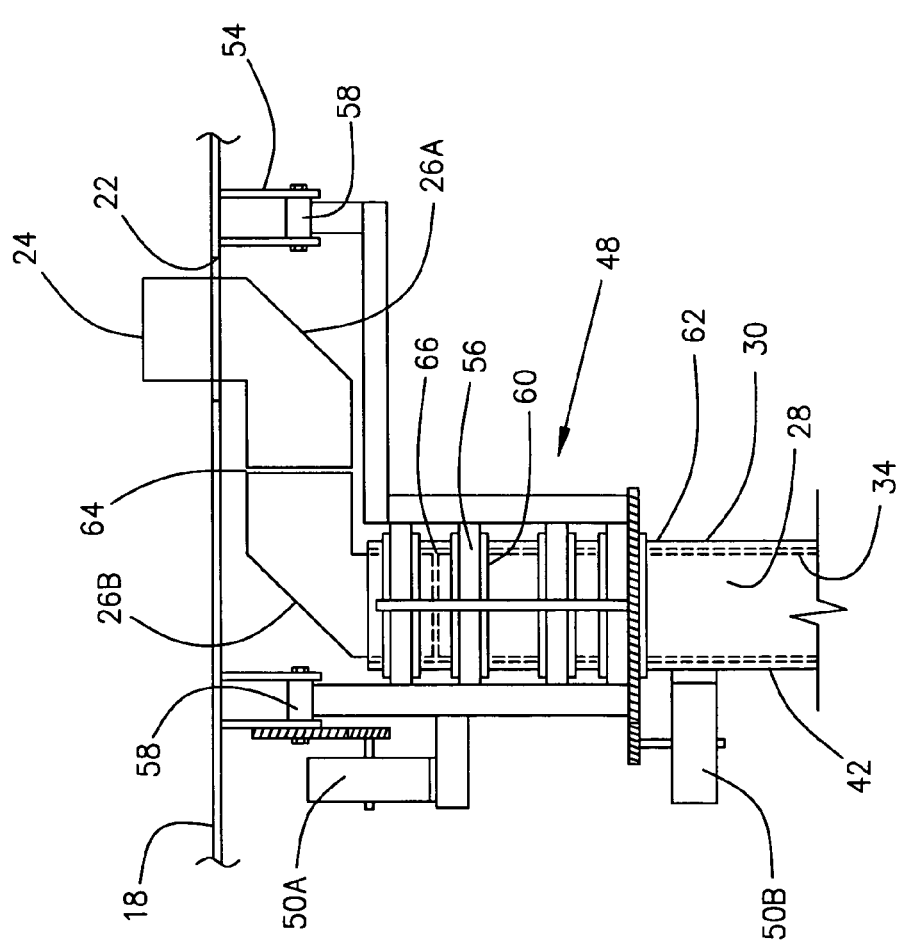

SOLAR BLACKBODY WAVEGUIDE FOR SOLAR ASSISTED OIL RECOVERY APPLICATIONS

BACKGROUND OF THE INVENTION

1. Field of the Invention

The present invention relates to a method for enhancing in-situ oil production from oil shale, oil sand, asphaltic crude oil, or other high viscosity crude oil formations. This method employs delivering energy in the form of concentrated solar flux to these formations in order to passively heat them and thereby increase their oil production.

2. Description of the Related Art

The heating of oil shale formations has been demonstrated in the prior art as the critical component of the in-situ production of oil from oil shale. Heating of the formation has also been shown in the prior art to enhance production yields from certain oil-bearing zones containing viscous crude oils such as oil sand formations and asphaltic crude fields.

Approximately two trillion (2,000,000,000,000) barrels of potentially recoverable oil shale resources are located in the eastern and western states of the United States. The western states alone contain approximately 62% of the world's known oil shale deposits. However, the term "oil shale" is not an accurate description for these potential energy resources. In fact, they are not truly petroleum oil nor do the rock formations consist of shale. The organic material is primarily kerogen, not oil, and the kerogen bearing rock strata are often comprised of a relatively hard material called marl. The kerogen can be processed into a petroleum-like substance by the introduction of heat.

Unlike naturally occurring petroleum oil deposits, the organic kerogen deposits have not been through the "oil window" of heat. This "oil window" of heat is the final step in the natural development of petroleum oil. These shale formations are often located too shallow in the earth to have been subjected to sufficient temperatures to complete the process of transformation into the liquid oil form.

The two most common techniques currently employed for extraction of kerogen from the oil shale are surface mining and then heating the mined shale (also referred to as retorting techniques) or in-situ heating production techniques.

Traditional retorting techniques present several problems and limitations. Traditional retorting techniques remove the kerogen bearing material or "shale" using conventional open pit or room and pillar mining equipment and processes. The shale is crushed and heated or retorted in a surface heater or retort resulting in the recovery of kerogen oil, a petroleum-like liquid. The costs associated with the mining processes and the inefficiencies of the retorting equipment limit the economic viability of traditional retorting processes. Also, post-retort residual rock fines and other tailings from the mining process have a significant adverse environmental impact. The volume increase of spent shale, due primarily to the crushing prior to heating, can be as high as 30%. This increase in volume results in an inability to return all of the residual materials to landfill in the mines from which they originated.

The other common technique involves in-situ heating of the formation. This technique differs depending on whether the formation is kerogen bearing oil shale or is viscous crude oil bearing oil sand or asphaltic crude field. In-situ heating techniques also present several problems and limitations.

The In-situ Conversion Process (ICP) is an emerging technology in which heat is added underground to a kerogen bearing formation over a period of years. This heat slowly converts the kerogen into hydrocarbon gases and kerogen oil. Then these gases and kerogen oil are recovered using conventional oil production techniques.

Using ICP, electric or gas heaters are inserted into vertical wells surrounding a producing well and the heaters are used to heat the ore-bearing strata. Due to the slow heating involved with this technique, the quality of the kerogen oil produced is increased compared to retort processes. Unfortunately, a large amount of electrical energy or gas is needed to heat and to maintain the formation at a sufficient temperature. In addition to the fuel costs, the remote location of these types of oil producing fields necessitates construction of pipelines or electrical transmission infrastructure to bring sufficient gas or electricity to these sites. Without relatively high oil prices to support the additional operation and capital construction costs, these extraction techniques can be cost prohibitive.

The current practice for extraction of bitumen from oil sands consists primarily of surface mining and heating. This process has similar limitations to the oil-shale mining techniques discussed above. Specifically those limitations involve the mining and heating costs which limit the economic viability of the process.

The in-situ heat requirement for oil sands is different than for oil shale since the bitumen in oil sand consists primarily of a highly viscous crude oil that needs to be heated to improve its flow characteristics. Currently, steam flood techniques are the preferred in-situ heating technique for oil sand deposits. When steam enters the formation, the steam gives up heat and condenses in the formation to form water. Once the bitumen has been heated in-situ, a mixture of bitumen and water can then be recovered using conventional oil production techniques. These in-situ techniques are economically limited due to the cost of energy to create steam and the need for large quantities of water.

The present invention addresses these problems by employing a readily available source of energy, i.e. sunlight, to heat the formations. The invention involves a method to enhance oil shale, oil sand, asphaltic crude oil, or other high viscosity crude oil production by efficiently and effectively converting concentrated energy in the form of solar flux into useable forms of heat energy that can be employed to heat the formations.

Use of solar energy to provide the heat required for these operations allows for a cost-effective method to enhance oil production without the current practice of burning fossil fuels or use of electrical heating. The present invention employs solar blackbody waveguide technology, acting as a solar-powered heating element, to directly heat the geological strata of these ore-bearing and oil-bearing formations.

SUMMARY OF THE INVENTION

The present invention is a method to enhance oil shale, oil sand, asphaltic crude oil, or other high viscosity crude oil production by using concentrated energy in the form of solar flux to provide the energy to heat these formations in situ. This method uses a solar blackbody waveguide, acting as a solar-powered heating element, to direct heat to these oil bearing formations.

The solar blackbody waveguide is provided with one or more parabolic mirrors which are used to concentrate solar energy radiating from the sun. The amount of solar energy concentrated depends on the heat requirements of the in-situ heating process, but energy densities in excess of 300 KW per well casing are realizable. The parabolic mirrors move to follow the daily path of the sun as the sun appears to travels across the sky and are moveable to allow them to continually face the sun approximately perpendicularly throughout the year.

The concentrated solar energy gathered by the parabolic mirrors is directed via double 90° prisms into a vertical shaft of a well drilled through the overburden soils and into the ore-bearing or oil-bearing formation. This vertical shaft is lined with a highly reflective sleeve that reflects nearly all of the sunlight down the well bore. The reflective sleeve ends at the top of the ore/oil-bearing formation so that the solar flux or light is permitted to make successive reflections off the interior of the metal well casing. This causes the solar flux to be converted to heat energy.

The metal well casing in which the light is internally reflected is referred to as the solar blackbody waveguide coil. This coil converts the introduced electromagnetic solar flux energy directly to mechanical heat energy using a conversion process with the characteristics of a classical blackbody wherein electromagnetic energy is incrementally absorbed by numerous internal reflections inside a cavity. The particular geometry of the cavity element wherein the electromagnetic energy is absorbed acts as a waveguide in a manner that the electromagnetic energy is transported on a path length and along which the electromagnetic energy is absorbed by numerous interior reflections.

The solar energy absorbed by the coil causes the coil to become hot. This heat is transferred by conduction from the coil into the ore or oil-bearing formation, thereby gradually heating the strata of the formation. The rate of curvature of the coil is controlled by directional drilling techniques to permit relatively uniform, linear absorption of the heat energy along the entire length of the coil element within the formation. Other desired absorption characteristics are controlled by the path curvature and length of the directional drill.

BRIEF DESCRIPTION OF THE DRAWINGS

FIG. 1 is a partial side view of a solar blackbody waveguide showing solar flux being collected by one parabolic mirror and being directed via double 90° prisms into a vertical shaft of a well that has been drilled through the overburden soils and into the ore-bearing or oil-bearing formation.

FIG. 2 is a front plan view of the parabolic mirror taken along line 2-2 of FIG. 1.

FIG. 3 is rear view of the double 90° prisms taken along line 3-3 of FIG. 1.

FIG. 5 is an enlarged side view of the portion of the solar blackbody waveguide contained within circle 5 of FIG. 4 showing in detail the mechanism by which the parabolic mirror can be moved.

FIG. 6 is a rear view of the mechanism by which the parabolic mirror can be moved taken along line 6-6 of FIG. 5.

DETAILED DESCRIPTION OF THE PREFERRED EMBODIMENT

THE INVENTION

Figure 4:
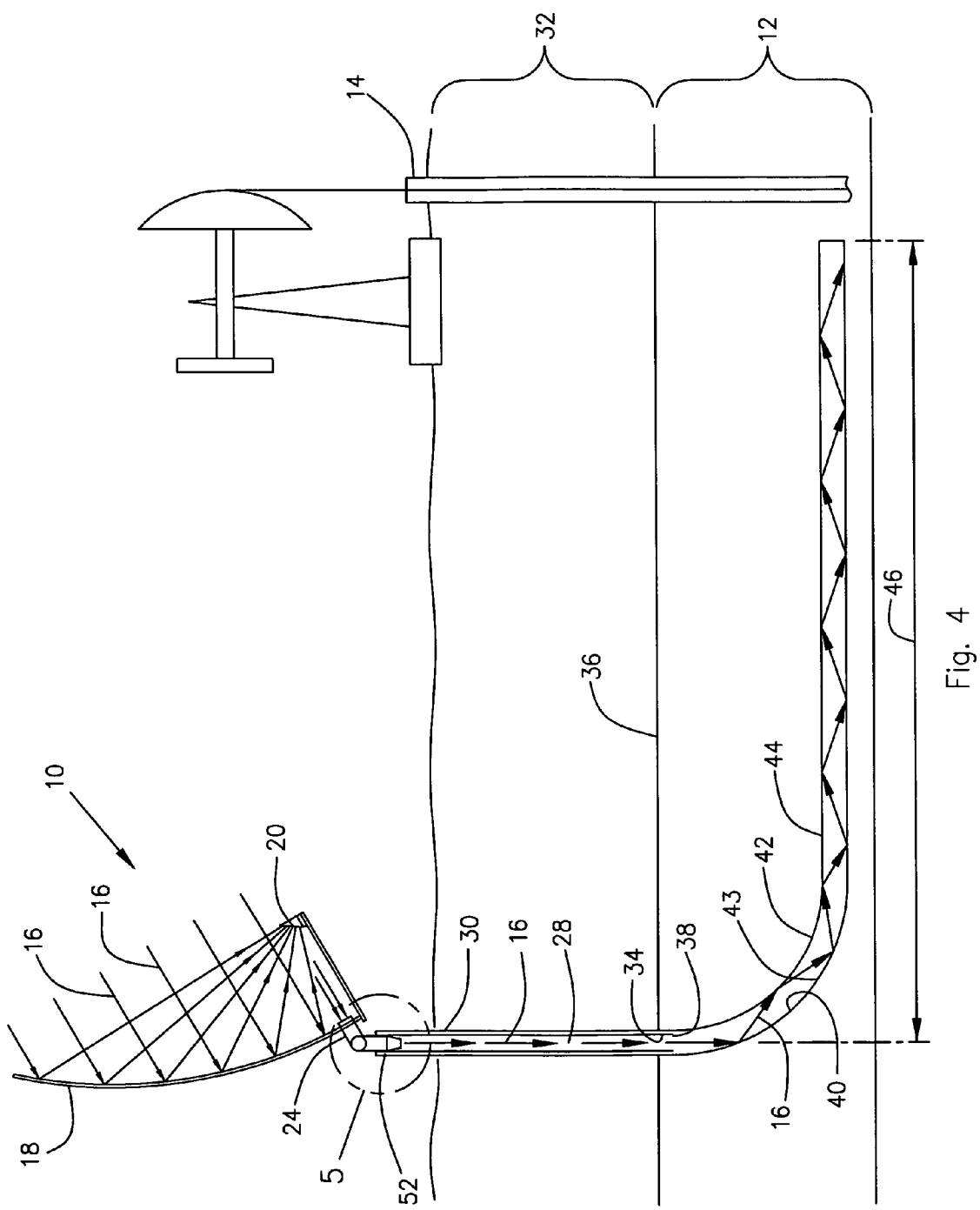
FIG. 4 is a diagram showing the solar blackbody waveguide of FIG. 1 installed in an ore-bearing or oil-bearing formation in association with a crude oil producing well located in that same formation.

Referring now to the drawings and initially to FIG. 4, there is shown a solar blackbody waveguide 10 installed in an ore-bearing or oil-bearing formation 12 in association with a crude oil producing well 14 located in that same formation 12. This illustration shows a method to enhance oil shale, oil sand, asphaltic crude oil, or other high viscosity crude oil production in a formation 12 by using concentrated energy in the form of light, light rays, solar energy, or solar flux 16 to provide the energy to heat the formations 12 in situ. The method uses a solar blackbody waveguide 10 which acts as a solar-powered heating element to direct heat to the oil bearing formation 12.

Referring now also to FIGS. 1 and 2, the solar blackbody waveguide 10 is provided with one or more parabolic mirrors 18 which are used to concentrate solar energy 16 radiating from the sun (not illustrated). For ease of illustration, only one parabolic mirror 18 is illustrated in the drawings.

Parallel incident light rays 16 from the sun are reflected from the primary parabolic mirror 18 toward a secondary parabolic mirror 20. The secondary parabolic mirror 20 is located so that it faces the primary parabolic mirror 18. The light 16 is then reflected from the secondary parabolic mirror 20 through an opening 22 provided in the primary parabolic mirror 18 into a waveguide 24. As illustrated in FIGS. 3 and 6, the waveguide 24 is provided with double 900 prisms 26A and 26B which direct the concentrated solar flux 16 being collected by the parabolic mirror 18 into a vertical shaft or well bore 28 of a well 30 that has been drilled through the overburden soils 32 and extends into the ore-bearing or oil-bearing formation 12.

This vertical shaft 28 is lined with a highly reflective sleeve 34 that reflects nearly all of the sunlight 16 down into the well bore 28 in a nearly lossless manner. The reflective sleeve 34 ends at the top 36 of the ore/oil-bearing formation 12 so that the solar flux 16 passes out of the open bottom 38 of the reflective sleeve 34 and then is permitted to make successive reflections off the interior 40 of the metal well casing 42 in the portion 44 of the well casing 42 that extends into the ore/oil bearing formation 12. These reflections are lossy. As the light 16 reflects off the interior 40 of the metal well casing 42, the electromagnetic energy of the solar flux 16 converts directly to mechanical heat energy. The metal well casing 42 in which the light is internally reflected is referred to as the solar blackbody waveguide coil 42.

The solar energy absorbed by the coil 42 causes the coil 42 to become hot. This heat is transferred by conduction from the coil 42 into the ore or oil-bearing formation 12, thereby gradually heating the strata of the formation 12. The rate of curvature or curve 43 of the coil 42 is controlled by directional drilling techniques to permit relatively uniform, linear absorption of the heat energy along the entire length 46 of the coil 42 within the formation 12. Other desired absorption characteristics are controlled by the path curvature 43 and length 46 of the coil 42, as determined by the directional drill.

In order to maximize the amount of solar flux 16 collected by the parabolic mirror 18, it is important that the parabolic mirror 18 always be directly facing the sun throughout each day and throughout each season of the year. Thus, the parabolic mirror 18 must be moved to follow the daily path of the sun as the sun appears to travels across the sky and must also move to allow the parabolic mirror 18 to continually face the sun approximately perpendicularly throughout the year. The tracking mechanism 48 that moves the parabolic mirror 18 is illustrated in FIGS. 5 and 6.

The tracking mechanism 48 employs two drive motors, an altitude drive motor 50A and an azimuth drive motor 50B, to move the parabolic mirror 18. The parabolic mirror 18 and its associate waveguide 24 are supported on a tower 52 by a primary mirror support structure 54 that secures to a bearing and structural support assembly 56 via a pair of pivot point bearings 58. The bearing and structural support assembly 56 is rotatably secured via bearings 60 to the top 62 of the well casing 42. The altitude drive motor 50A is secured to the bearing and structural support assembly 56 and acts upon the primary mirror support structure 54 to cause the primary mirror support structure 54 to move relative to the bearing and structural support assembly 56 by pivoting at the two pivot point bearings 58, thereby changing the altitude of the parabolic mirror 18 relative to the bearing and structural support assembly 56. A first air gap 64 is provided in the waveguide 24 between the double 90° prisms 26A and 26B to allow pivoting at the pivot point bearings 58 without damage to the waveguide 24.

Also, the azimuth drive motor 50B is secured to the top 62 of the well casing 42 and acts upon the bearing and structural support assembly 56 to rotate the bearing and structural support assembly 56 and the attached parabolic mirror 18 relative to the well casing 42. A second air gap 66 is provided in the waveguide 24 below the double 90° prisms 26A and 26B to allow relative rotational movement between the bearing and structural support assembly 56 and the well casing 42 without damage to the waveguide 24.

Although not illustrated, the altitude drive motor 50A and the azimuth drive motor 50B are computer controlled so as to constantly keep the parabolic mirror 18 facing the sun in a manner similar to that previously taught in Applicant's U.S. Pat. No. 6,899,097 issued on May 31, 2005 for Solar Blackbody Waveguide for Efficient and Effective Conversion of Solar Flux to Heat Energy and in Applicant's U.S. patent application Ser. No. 11/273,166 filed on Nov. 14, 2005 for Solar Blackbody Waveguide for High Pressure and High Temperature Applications.

While the invention has been described with a certain degree of particularity, it is manifest that many changes may be made in the details of construction and the arrangement of components without departing from the spirit and scope of this disclosure. It is understood that the invention is not limited to the embodiments set forth herein for the purposes of exemplification, but is to be limited only by the scope of the attached claim or claims, including the full range of equivalency to which each element thereof is entitled.

What is claimed is:

1. The method to enhance oil shale, oil sand, asphaltic crude oil, or other high viscosity crude oil production by using a solar blackbody waveguide to heat these formations in situ comprising:
    collecting and concentrating solar flux by employing a system of mirrors,
    directing the solar flux from the system of mirrors into a shaft of a well drilled into a formation to be heated so that the solar flux travels in a lossless manner to the area of the formation to be heated within a reflective sleeve provided within a solar coil that serves as the casing for the shaft, and
    reflecting the solar flux successively in a lossy manner within the interior portion of the solar coil located within the formation to be heated so that the coil is heated by the solar flux and thereby heats the formation by conduction.

2. The method to enhance oil shale, oil sand, asphaltic crude oil, or other high viscosity crude oil production by using a solar blackbody waveguide to heat these formations in situ according to claim 1 further comprising:
    removing oil from the heated formation via an oil well that is drilled into the formation.

3. The method to enhance oil shale, oil sand, asphaltic crude oil, or other high viscosity crude oil production by using a solar blackbody waveguide to heat these formations in situ according to claim 1 further comprising:
    constantly moving the system of mirrors used for collecting and concentrating solar flux via a dual-axis tracking system to keep the system of mirrors facing the sun.

4. A solar blackbody waveguide for solar assisted oil recovery applications comprising:
    a system of mirrors for collecting and concentrating solar flux, said system of mirrors connected to a light waveguide which directs the solar flux from the system of mirrors into a reflective sleeve provided in a shaft of a well drilled into a formation to be heated,
    a solar coil that serves as the casing for the shaft, the reflective sleeve provided within said solar coil and extending within the shaft of the well from the light waveguide to an area of the formation to be heated so that the solar flux travels in a lossless manner within the reflective sleeve to the area of the formation to be heated, and
    the reflective sleeve being open at the end inside the area of the formation to be heated so that the solar flux exits the reflective sleeve and reflects successively in a lossy manner within the interior of a portion of the solar coil located within the formation to be heat thereby heating the coil and the surrounding formation.

5. The solar blackbody waveguide for solar assisted oil recovery applications according to claim 4 wherein said system of mirrors for collecting and concentrating solar flux further comprises:
    at least one primary parabolic mirror that continually faces the sun, a secondary parabolic mirror associated with each primary parabolic mirror to direct solar flux reflected to the secondary parabolic mirror from its associated primary parabolic mirror into the light waveguide.

6. The solar blackbody waveguide for solar assisted oil recovery applications according to claim 4 wherein the portion of the solar coil located within the formation to be heat is aligned in a manner that the solar flux exiting the end of the reflective sleeve reflects successively in a lossy manner within the interior of the portion of the solar coil located within the formation to be heat thereby heating the coil and the surrounding formation.

* * * * *